US009890022B2

(12) United States Patent
Neumann et al.

(10) Patent No.: US 9,890,022 B2
(45) Date of Patent: Feb. 13, 2018

(54) METHOD FOR SUSPENDING A ROTOR BLADE FROM A HUB OF A WIND TURBINE

(71) Applicant: General Electric Company, Schenectady, NY (US)

(72) Inventors: Ulrich Werner Neumann, Simpsonville, SC (US); Gaylon Mitchell Pfeiffer, Tampa, FL (US); Kevin Costain, Baltic, SD (US); Stephanie Willman, Greenville, SC (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 14/706,409

(22) Filed: May 7, 2015

(65) Prior Publication Data
US 2016/0327016 A1 Nov. 10, 2016

(51) Int. Cl.
*B66D 3/14* (2006.01)
*B23P 6/00* (2006.01)
(Continued)

(52) U.S. Cl.
CPC ............ *B66D 3/14* (2013.01); *B23P 6/002* (2013.01); *F03D 1/0675* (2013.01);
(Continued)

(58) Field of Classification Search
CPC .. B23P 19/04; B23P 6/00; B23P 6/002; B66D 3/14; F03D 13/20; F03D 13/10;
(Continued)

(56) References Cited

U.S. PATENT DOCUMENTS

| 7,353,603 B2 | 4/2008 | Wobben |
| 7,735,290 B2 | 6/2010 | Arsene |

(Continued)

FOREIGN PATENT DOCUMENTS

| CA | 2692705 | 8/2010 |
| EP | 2345811 B1 | 10/2012 |

(Continued)

OTHER PUBLICATIONS

European Search Report and Written Opinion issued in connection with corresponding Application No. EP 16168432.9 dated Sep. 22, 2016.

(Continued)

*Primary Examiner* — Sarang Afzali
(74) *Attorney, Agent, or Firm* — Dority & Manning, P.A.

(57) ABSTRACT

The present disclosure is directed to a suspension system for a wind turbine rotor blade and methods for suspending said rotor blade from a hub thereof. The method includes positioning the rotor blade in a substantially six o'clock position. Another step includes removing at least one root attachment assembly from an adjacent rotor blade and providing at least one passageway from an exterior surface of the adjacent rotor blade to the root attachment assembly. Still another step includes inserting a cable through the passageway such that the cable engages an interior surface of the adjacent rotor blade and extends from within the adjacent rotor blade to the lowered rotor blade. The method further includes securing the cable to the rotor blade at an attachment location. Next, the method includes lowering the rotor blade a vertical distance from the hub until the blade is supported by the cable.

8 Claims, 14 Drawing Sheets

(51) Int. Cl.
*F03D 1/06* (2006.01)
*F03D 13/10* (2016.01)
*F03D 13/20* (2016.01)

(52) U.S. Cl.
CPC .......... *F03D 1/0691* (2013.01); *F03D 13/10* (2016.05); *F03D 13/20* (2016.05); *F05B 2240/916* (2013.01); *Y02E 10/721* (2013.01); *Y02E 10/728* (2013.01); *Y10T 29/4973* (2015.01); *Y10T 29/4978* (2015.01); *Y10T 29/49318* (2015.01); *Y10T 29/49721* (2015.01)

(58) Field of Classification Search
CPC ...... F03D 1/0675; F03D 1/0691; F03D 80/50; F05B 2240/916; F05B 2240/60; F05B 2240/80; F05B 2230/10; F05B 2230/60; F05B 2230/70; F05B 2230/80; F05D 2230/00; F05D 2230/60; F05D 2230/10; F01D 25/285; F01D 5/30; Y10T 29/4978; Y10T 29/49819; Y10T 29/49318; Y10T 29/53; Y10T 29/49721; Y10T 29/4973; Y02E 10/721; Y02E 10/726; Y02E 10/728
See application file for complete search history.

(56) References Cited

U.S. PATENT DOCUMENTS

| | | |
|---|---|---|
| 7,785,073 B2 | 8/2010 | Wobben |
| 7,832,101 B2 | 11/2010 | Koesters |
| 7,877,934 B2 | 2/2011 | Livingston et al. |
| 8,033,791 B1 | 10/2011 | Watanabe |
| 8,052,396 B2 | 11/2011 | Wobben |
| 8,069,634 B2 | 12/2011 | Livingston et al. |
| 8,083,212 B2 | 12/2011 | Numajiri et al. |
| 8,118,552 B2 | 2/2012 | Nies |
| 8,191,253 B2 | 6/2012 | Vangsy |
| 8,240,962 B2 | 8/2012 | Livingston et al. |
| 8,360,398 B2 | 1/2013 | Diaz De Corcuera et al. |
| 8,528,735 B2 | 9/2013 | Nies |
| 8,562,302 B2 | 10/2013 | Bakhuis et al. |
| 8,584,355 B2 | 11/2013 | Holling |
| 8,595,931 B2 | 12/2013 | Riddell et al. |
| 8,602,700 B2 | 12/2013 | Johnson |
| 8,651,462 B2 | 2/2014 | Van Berlo et al. |
| 8,997,350 B2 * | 4/2015 | Trede ................ F03D 1/001 212/179 |
| 9,638,163 B2 * | 5/2017 | Holloway ............ F03D 80/50 |
| 2007/0266538 A1 | 11/2007 | Bervang |
| 2007/0290426 A1 | 12/2007 | Trede et al. |
| 2009/0167023 A1 | 7/2009 | Nies |
| 2010/0018055 A1 | 1/2010 | Fomsgaard et al. |
| 2010/0028152 A1 | 2/2010 | Tomohro et al. |
| 2010/0139062 A1 * | 6/2010 | Reed ................... F03D 13/10 29/23.51 |
| 2010/0254813 A1 | 10/2010 | Dawson et al. |
| 2011/0042632 A1 * | 2/2011 | Van Berlo ........... B66C 23/18 254/264 |
| 2011/0142636 A1 | 6/2011 | Curtin |
| 2012/0027561 A1 | 2/2012 | Riddell et al. |
| 2012/0076663 A1 | 3/2012 | From |
| 2012/0137481 A1 | 6/2012 | Lindberg et al. |
| 2012/0217089 A1 | 8/2012 | Fenger |
| 2013/0025113 A1 | 1/2013 | Arocena De La Rua et al. |
| 2013/0074335 A1 | 3/2013 | Amano |
| 2013/0098859 A1 | 4/2013 | See et al. |
| 2013/0236316 A1 | 9/2013 | Bitsch et al. |
| 2013/0236324 A1 | 9/2013 | Bech et al. |
| 2013/0318789 A1 * | 12/2013 | Gabeiras .............. B21K 3/04 29/889.7 |
| 2014/0010658 A1 | 1/2014 | Nielsen |
| 2014/0255186 A1 * | 9/2014 | Yenigun .............. F03D 7/0224 416/1 |

FOREIGN PATENT DOCUMENTS

| | | |
|---|---|---|
| EP | 2369174 B1 | 11/2012 |
| EP | 2616670 A1 | 7/2013 |
| JP | 2006152862 A | 6/2006 |
| WO | WO 2010/147480 A1 | 12/2010 |
| WO | WO 2011/064659 A2 | 6/2011 |
| WO | WO 2011/095167 A2 | 8/2011 |
| WO | WO 2012/065613 A1 | 5/2012 |

OTHER PUBLICATIONS

Related U.S. Appl. No. 14/480,656, filed Sep. 9, 2014.

* cited by examiner

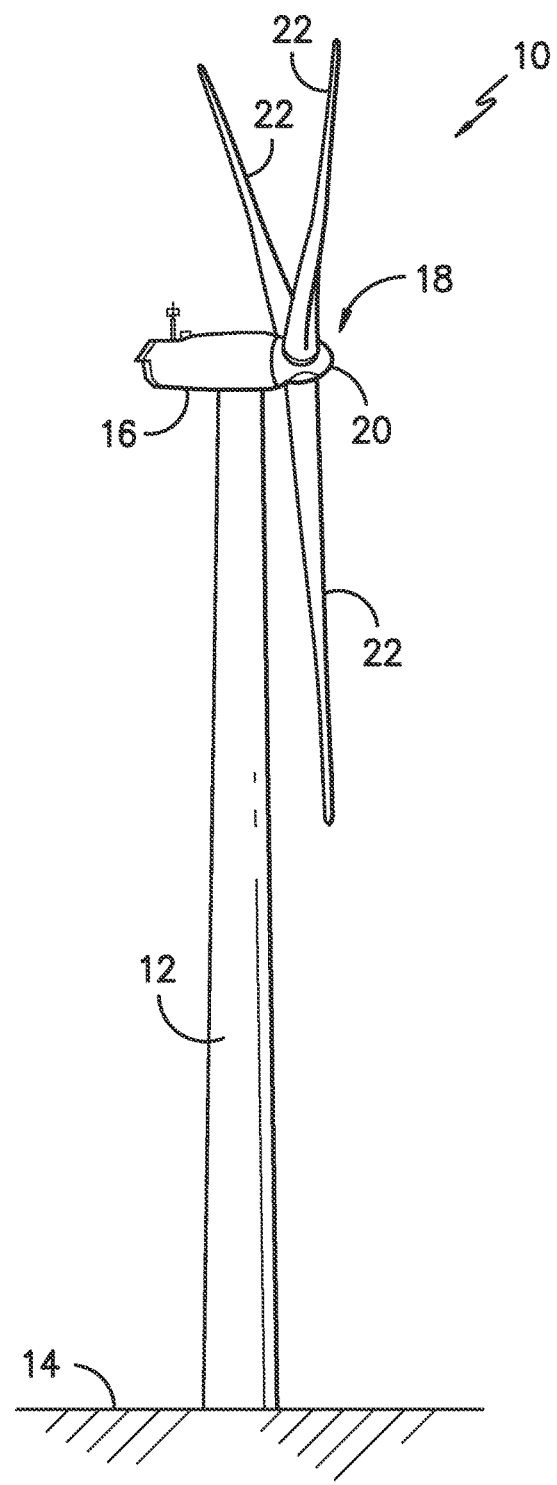
FIG. -1-
(PRIOR ART)

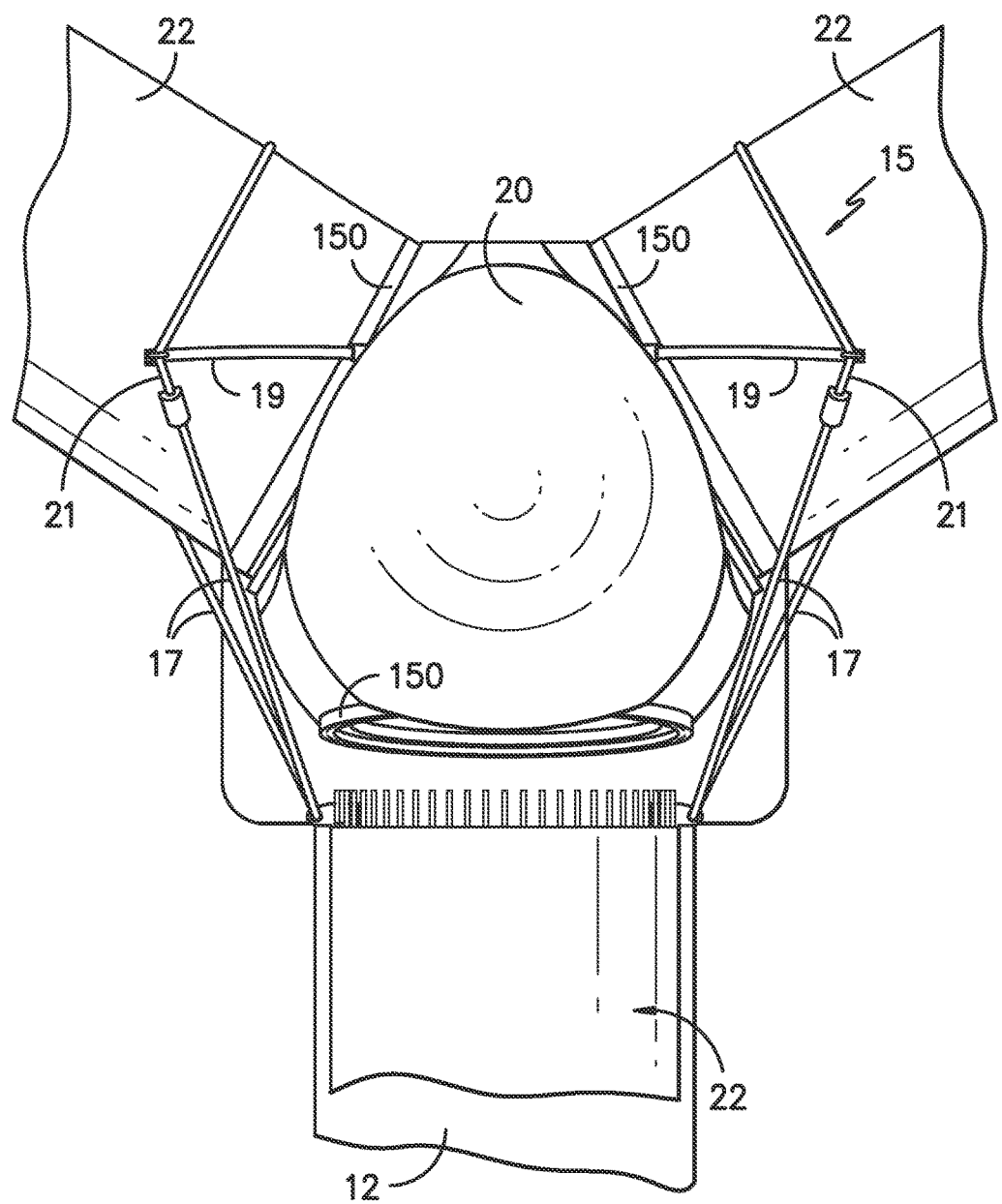
FIG. -2-
(PRIOR ART)

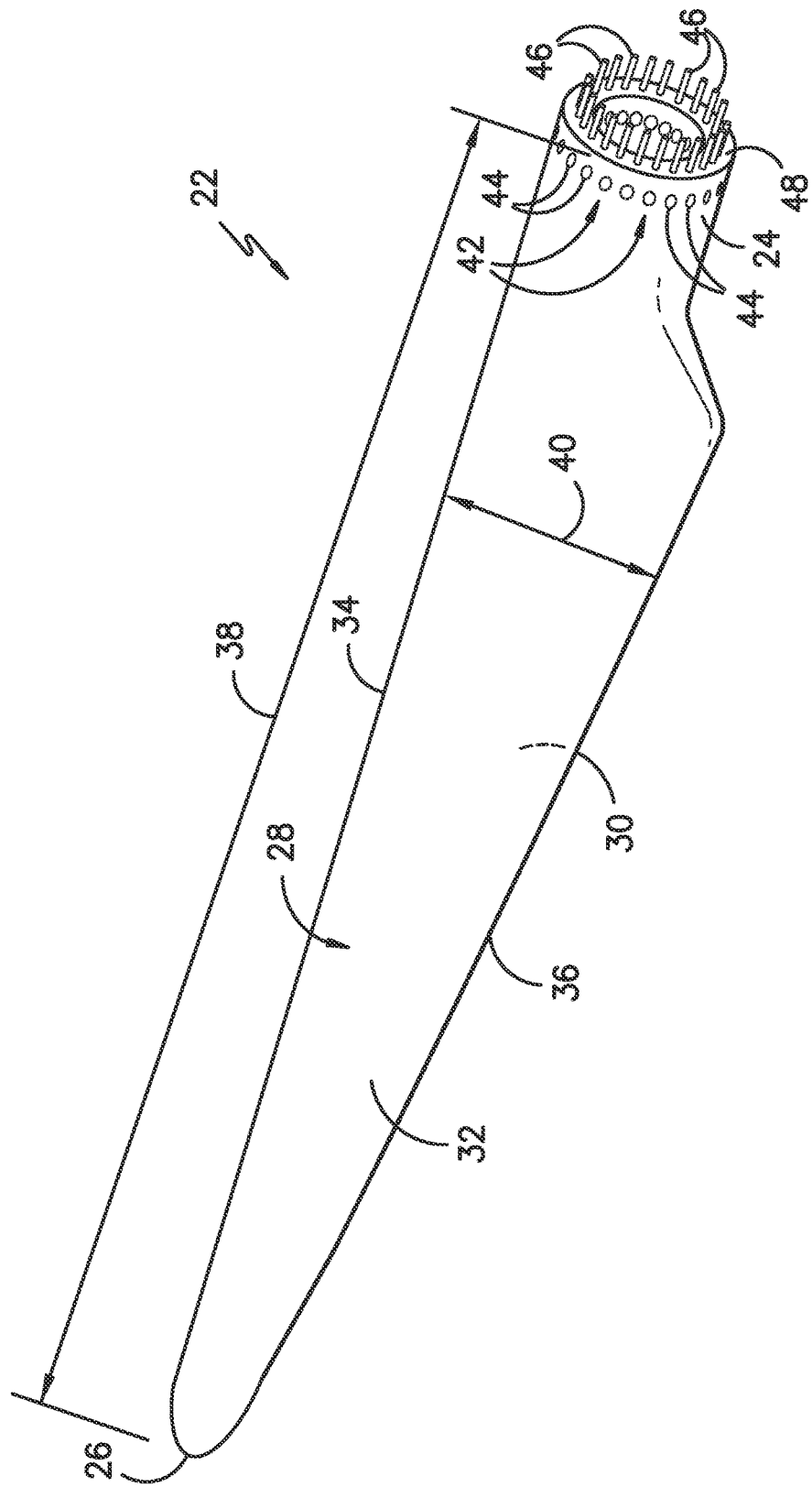
FIG. -3-

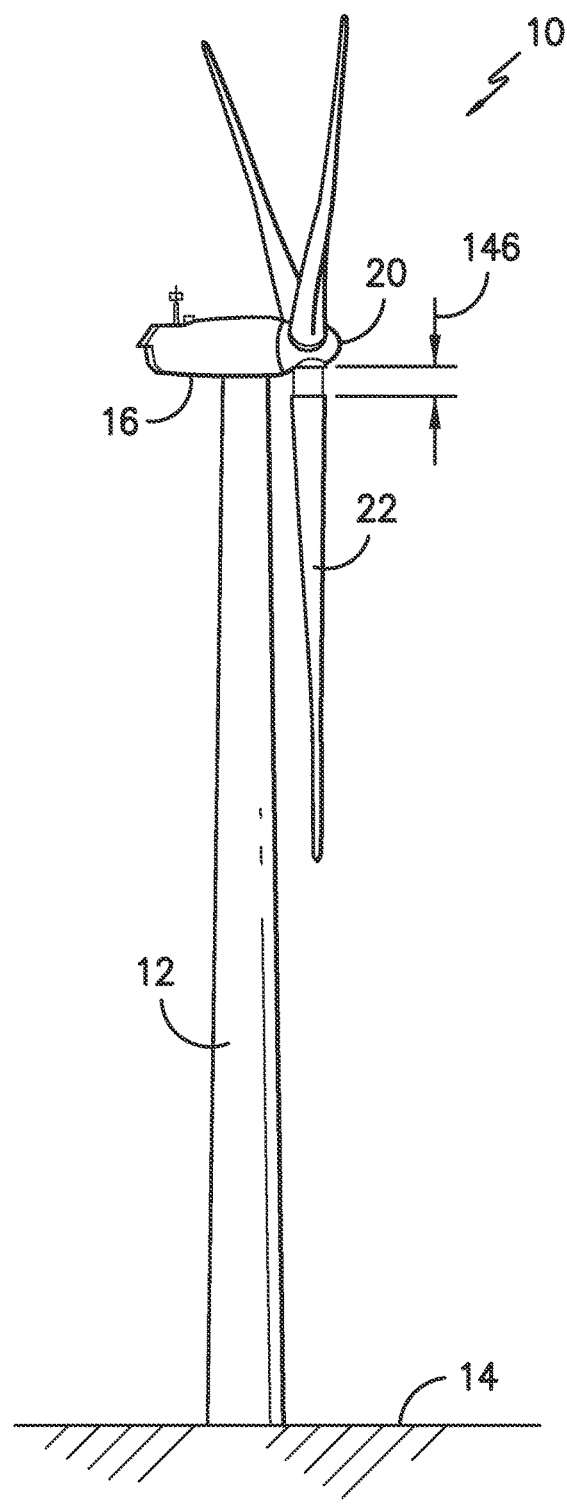
FIG. -4-

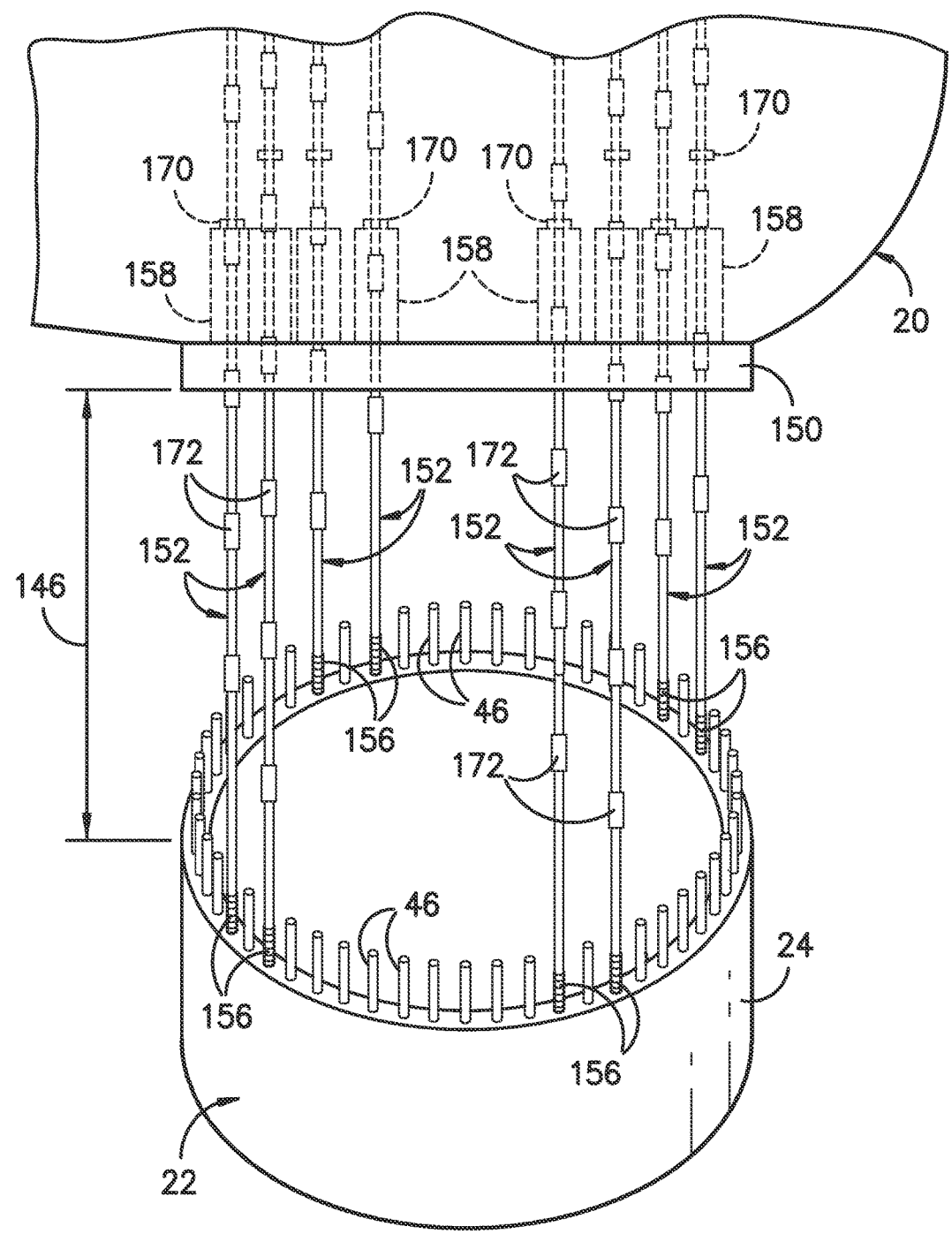
FIG. -5-

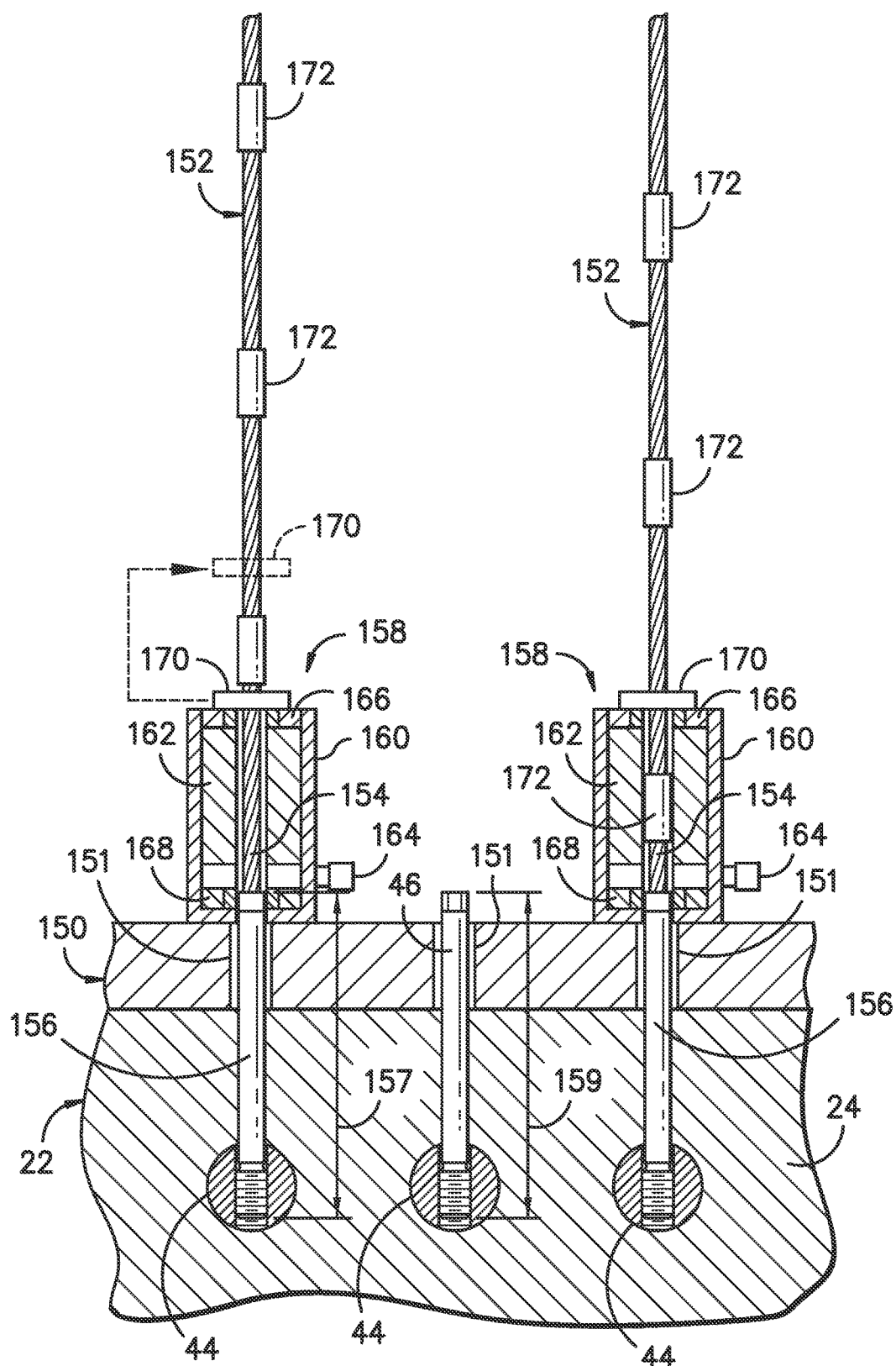
FIG. -6-

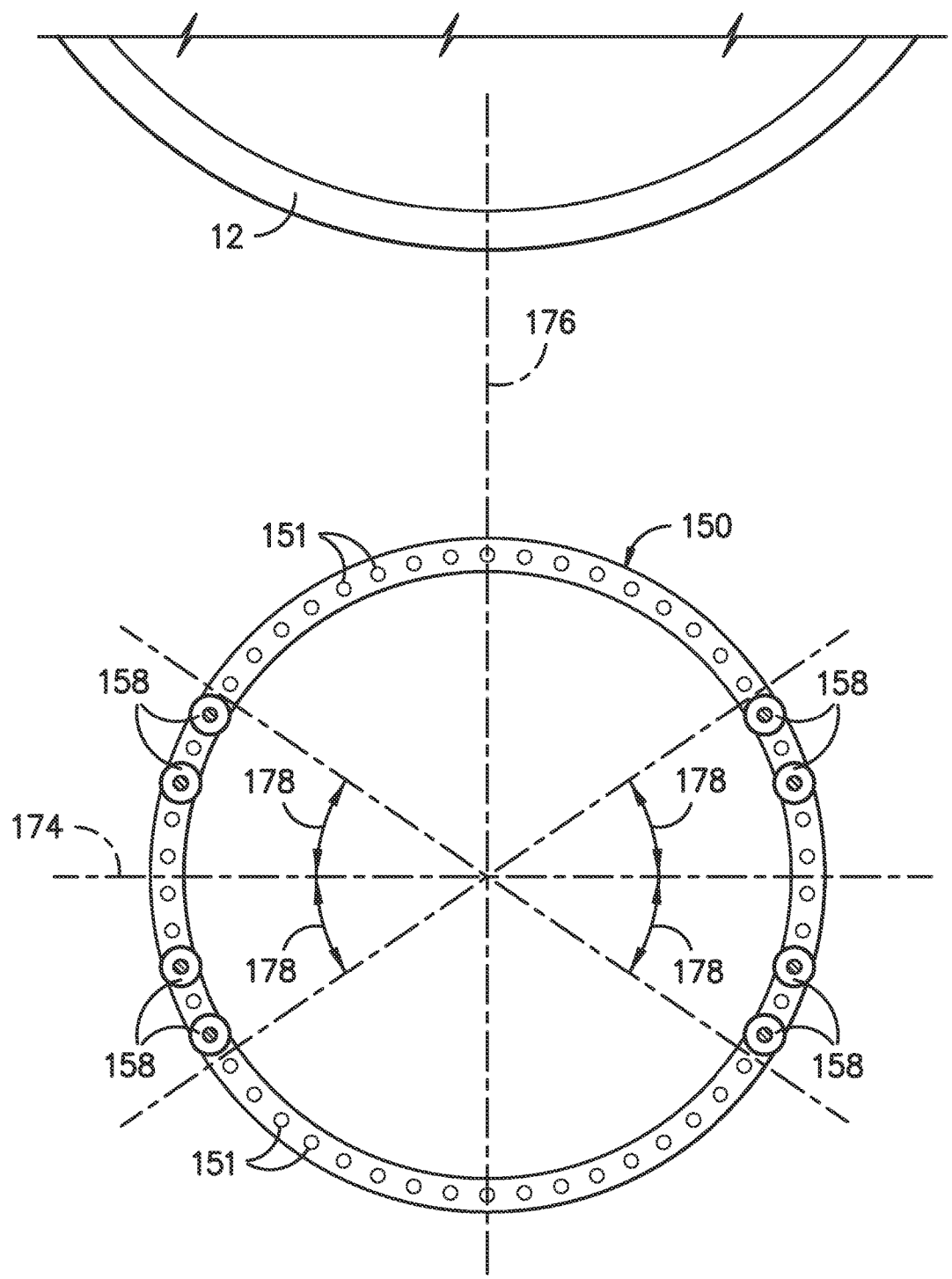
FIG. -7-

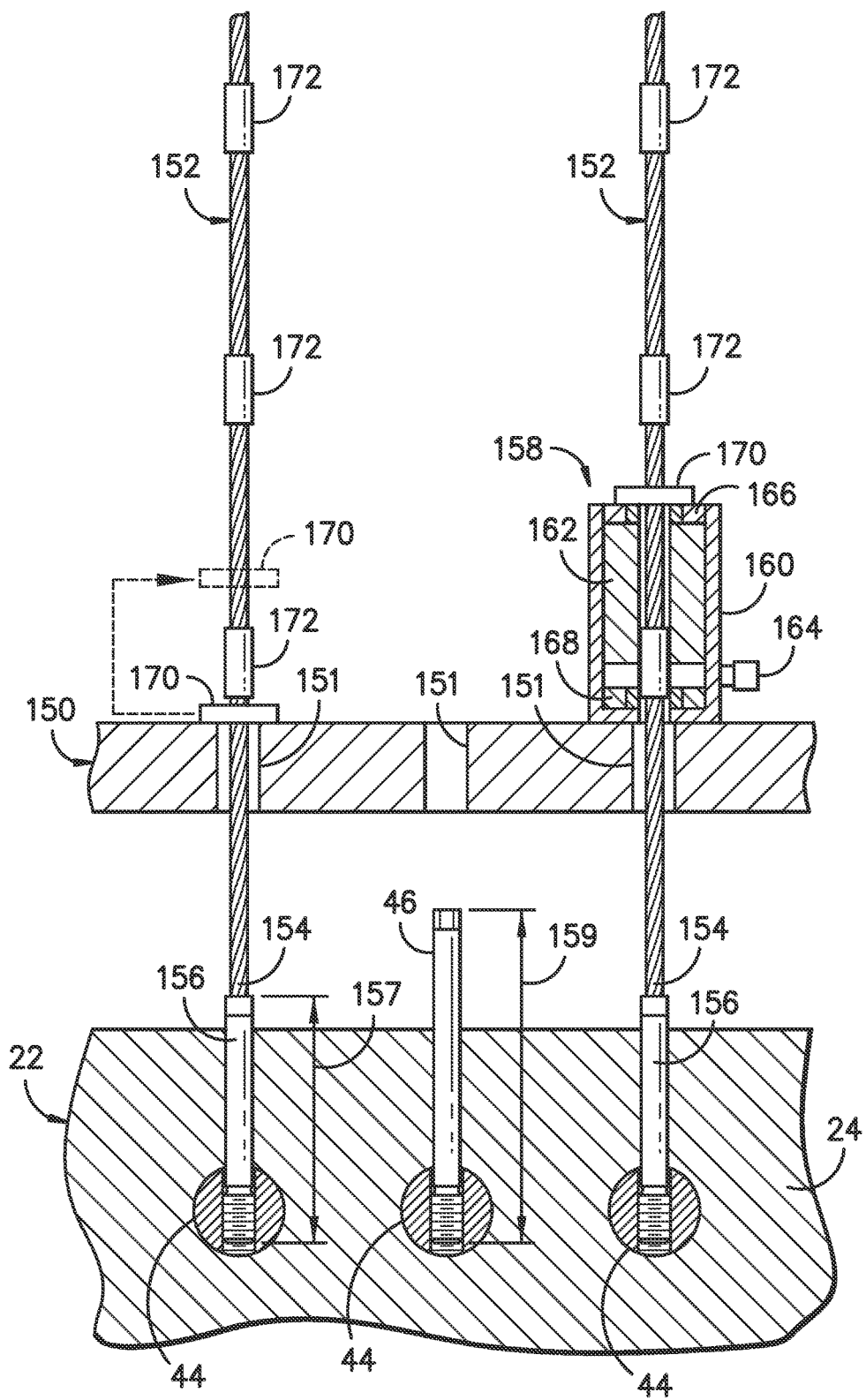
FIG. -8-

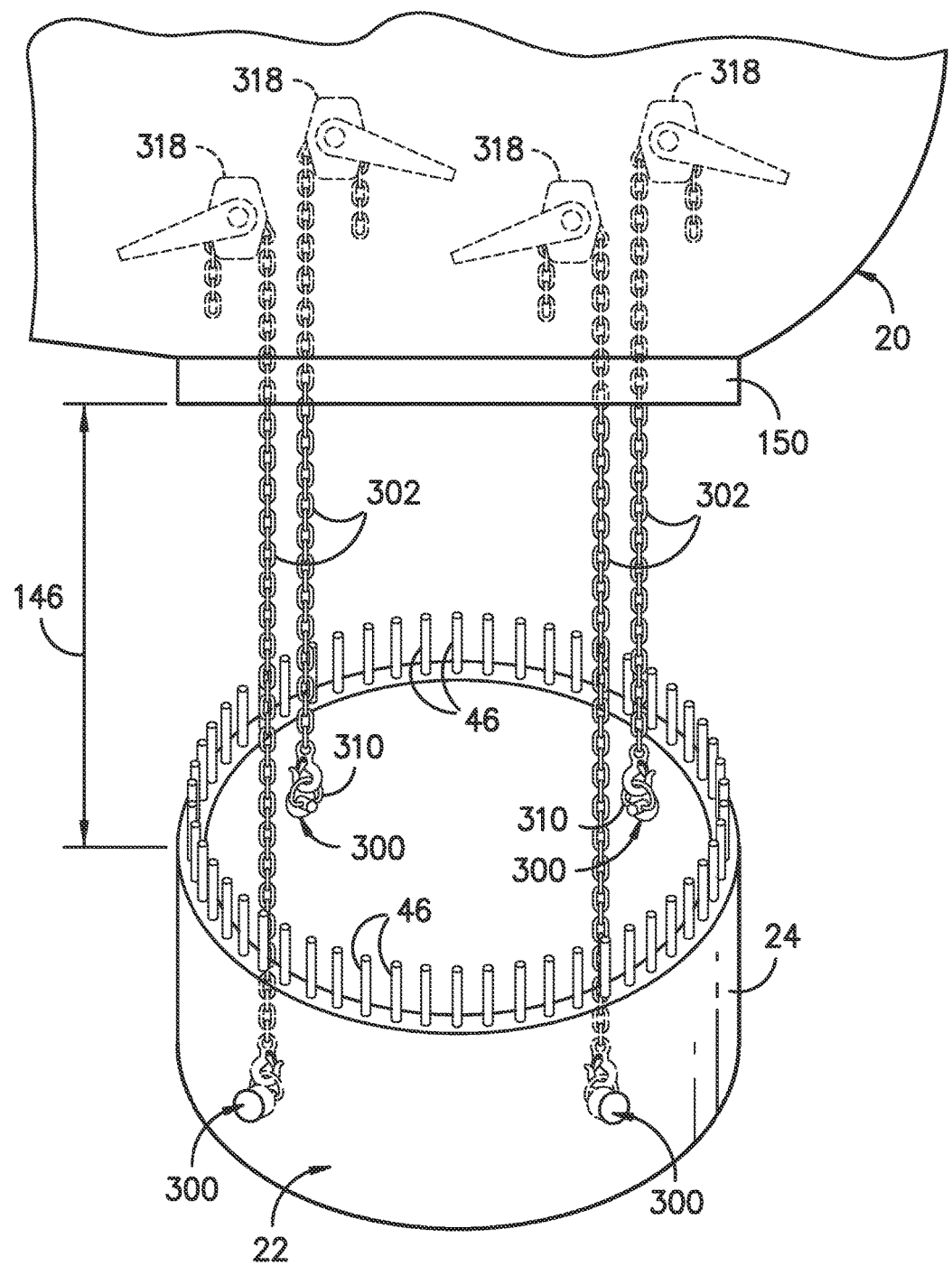
FIG. -9-

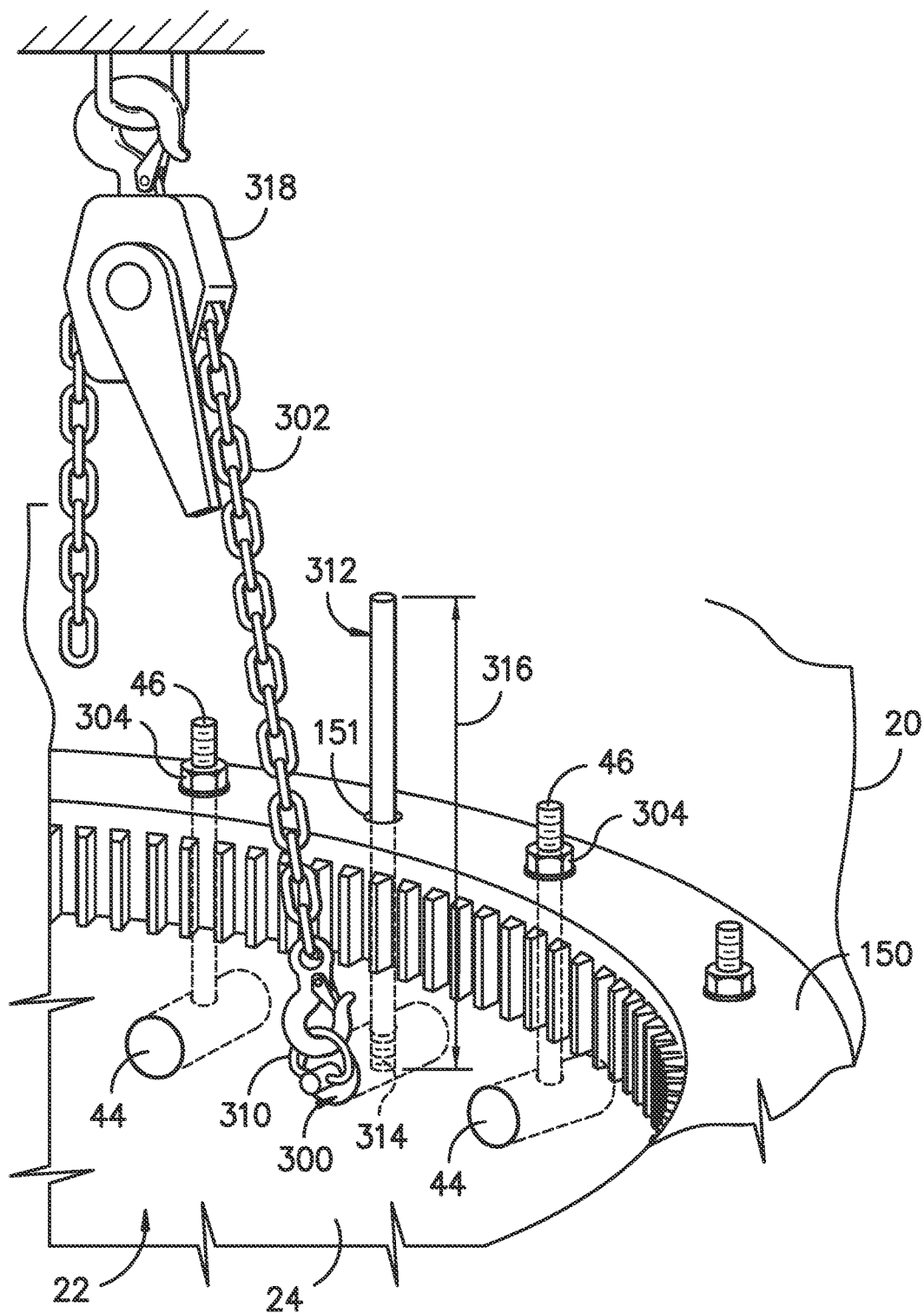
FIG. -10-

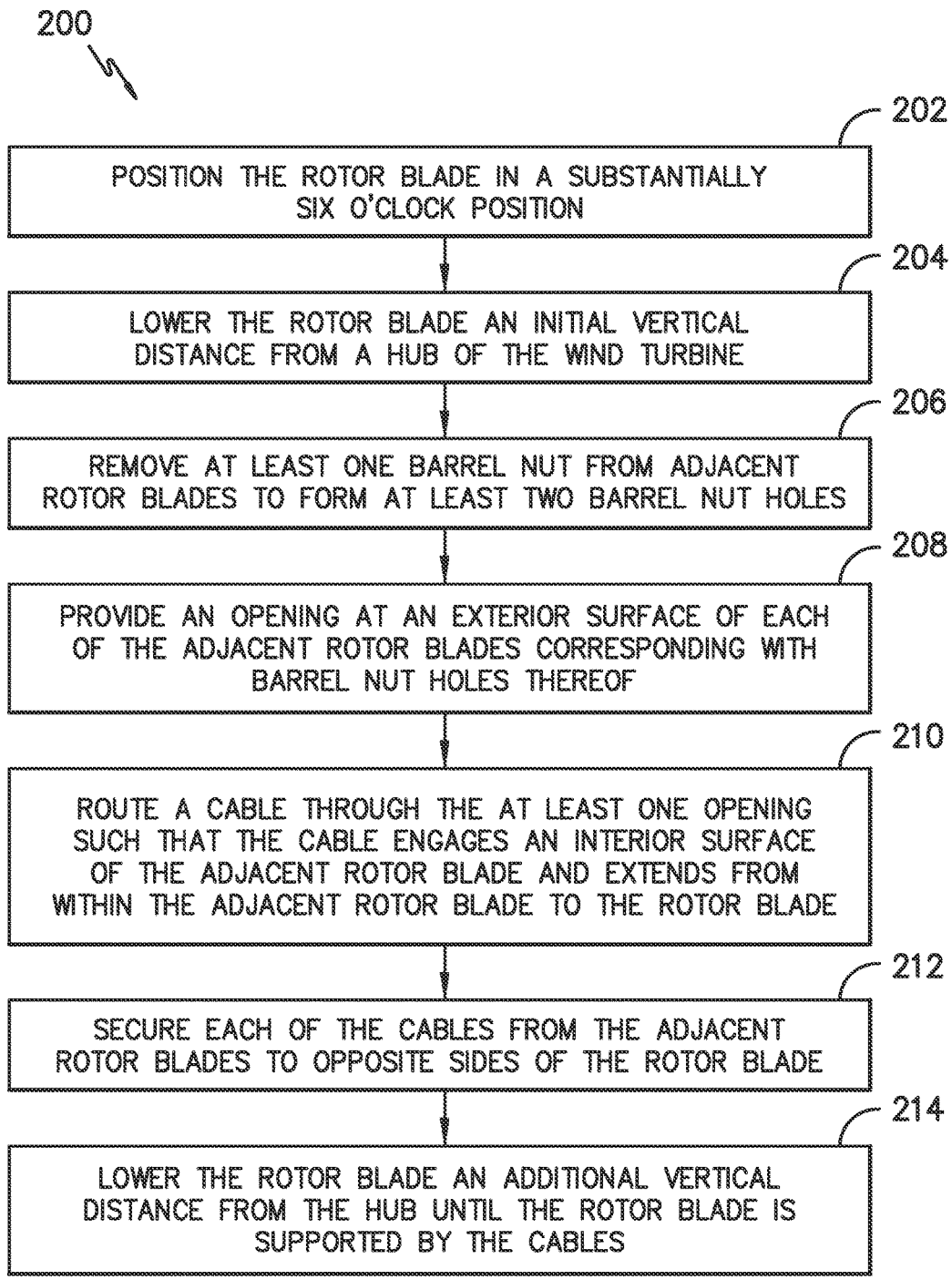
FIG. -11-

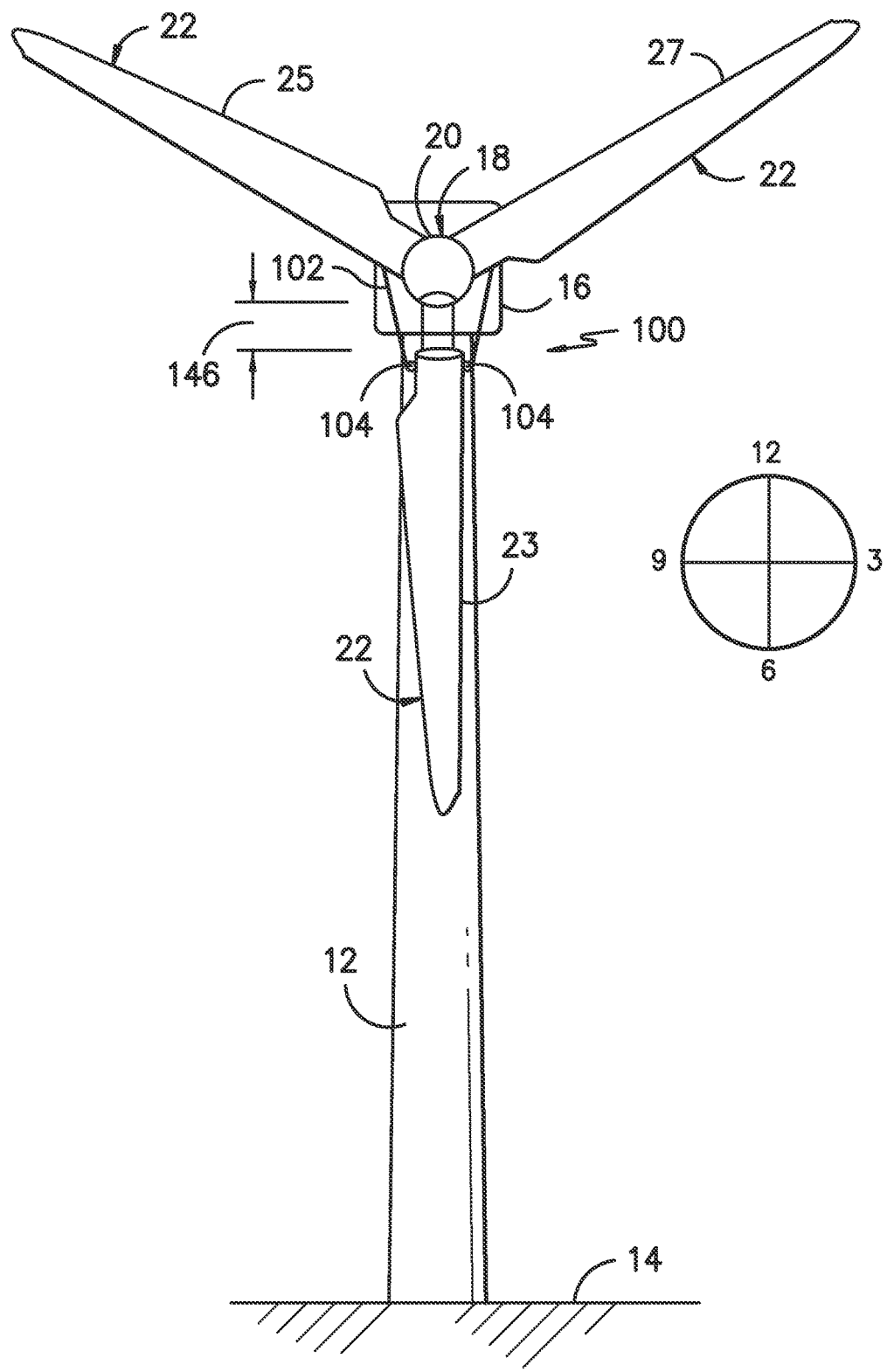
FIG. -12-

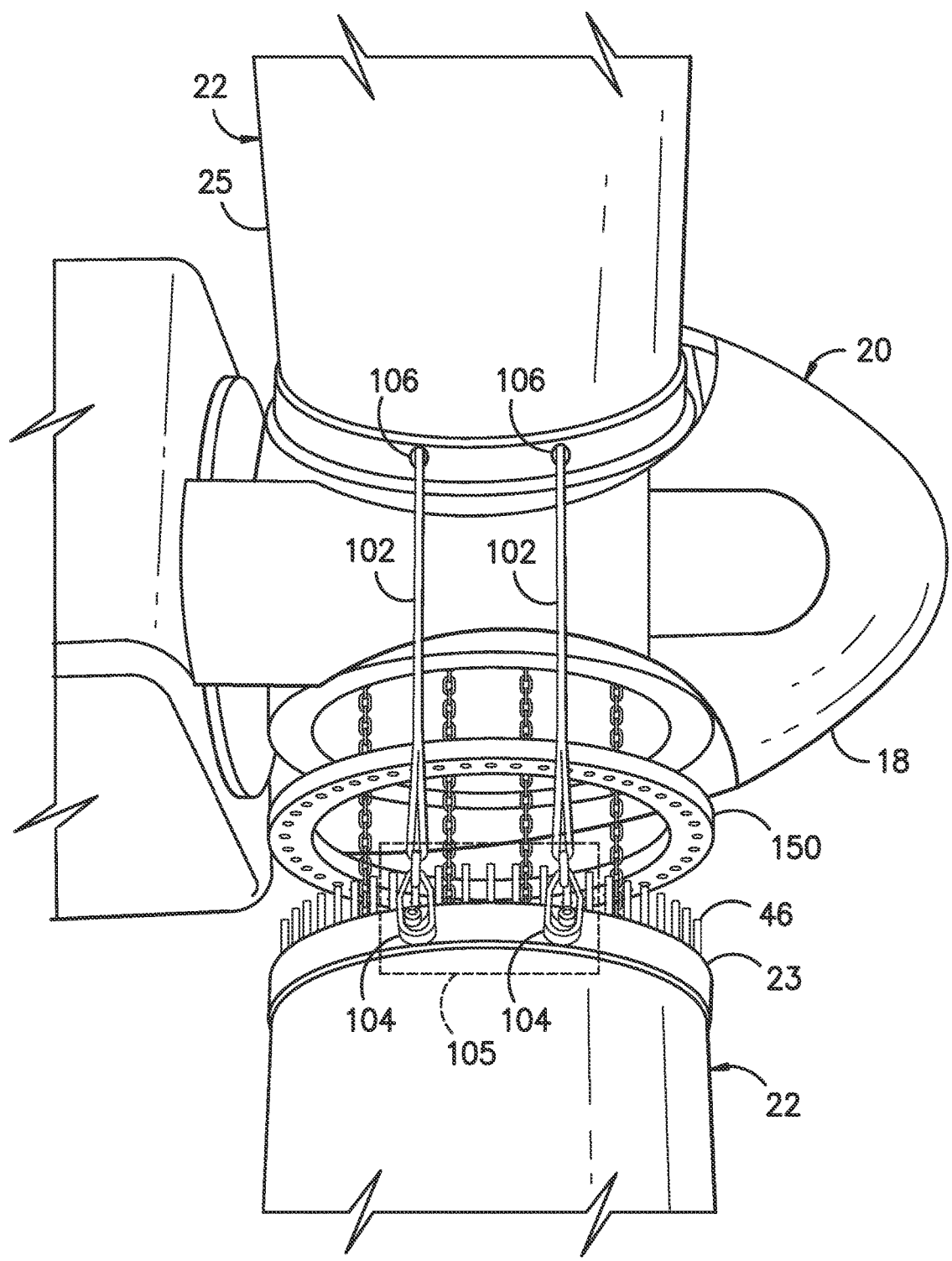
FIG. -13-

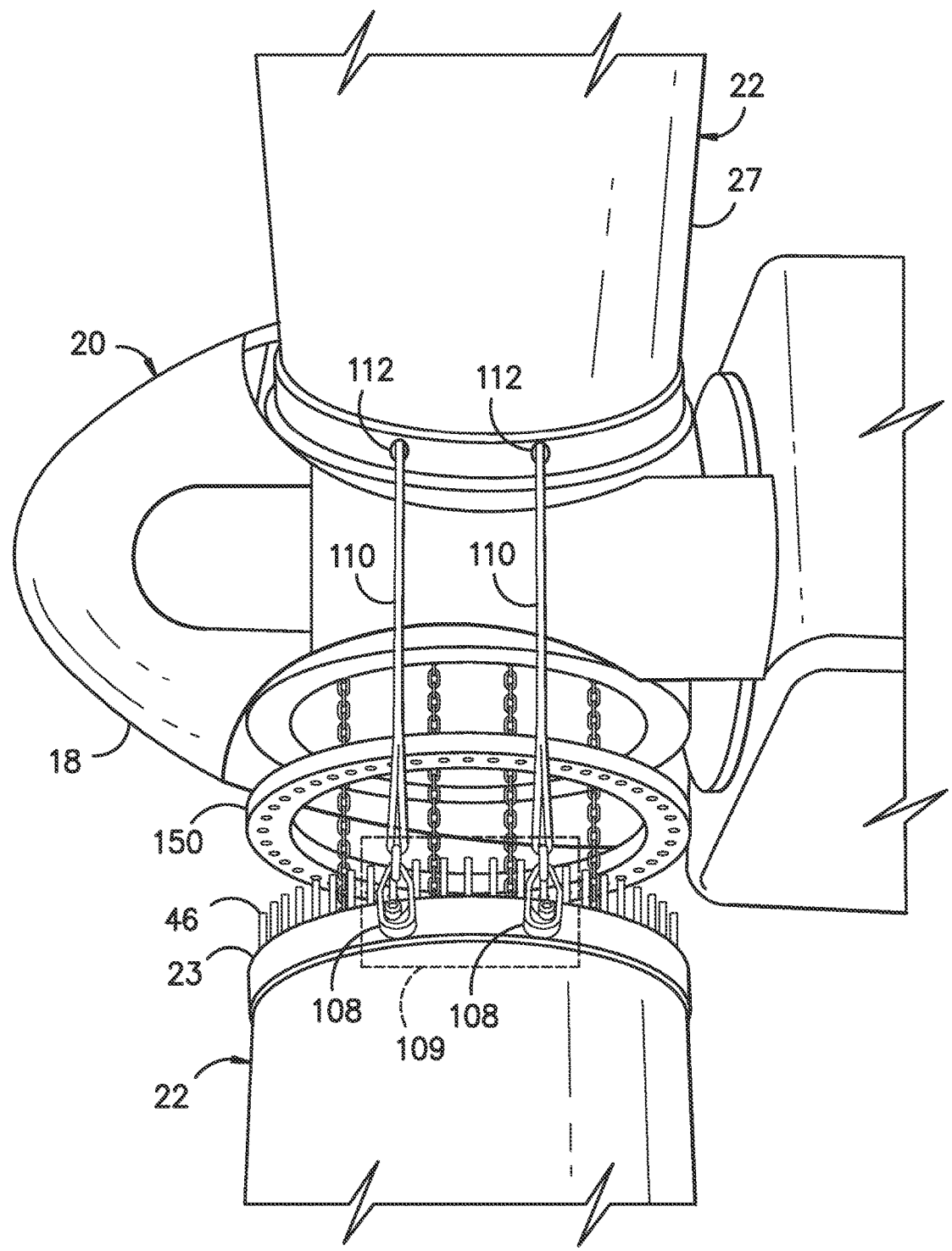
FIG. -14-

METHOD FOR SUSPENDING A ROTOR BLADE FROM A HUB OF A WIND TURBINE

FIELD OF THE INVENTION

The present disclosure relates generally to wind turbines, and more particularly to an up-tower suspension system for a wind turbine rotor blade.

BACKGROUND OF THE INVENTION

Wind power is considered one of the cleanest, most environmentally friendly energy sources presently available, and wind turbines have gained increased attention in this regard. As shown in FIG. 1, a modern wind turbine 10 typically includes a tower 12 extending from a support surface 14, a nacelle 16 mounted atop the tower 12, a generator and a gearbox (not shown) within the nacelle 16, and a rotor 18 mounted to the nacelle 16. The rotor 18 includes a rotatable hub 20 having one or more rotor blades 22 mounted thereto. Each of the rotor blades 22 are typically mounted to the hub via a pitch bearing. The pitch bearings are configured to change the pitch angle of each of the blades to capture kinetic energy of the wind using known airfoil principles. The rotor blades 22 transmit the kinetic energy from the wind in the form of rotational energy so as to turn a shaft coupling the rotor blades 22 to the gearbox, or if the gearbox is not used, directly to the generator. The generator then converts the mechanical energy to electrical energy that may be deployed to a utility grid.

Various maintenance and/or repair operations of the wind turbine 10 may require removal of one or more of the rotor blades 22 from the hub 20. For example, to replace one of the existing pitch bearings, the corresponding rotor blade is rotated to a six o'clock position such that the blade tip is pointed towards the ground. The blade bolts attaching the blade to the hub are then removed and the blade 22 is lowered an initial vertical distance from the hub. The rotor blade 22 may then be suspended from the hub 20 via a suspension system 15 as shown in FIG. 2. As shown, the suspension system 15 generally includes two endless support straps 17 draped over the upper, rabbit-eared blades 22. To keep these support straps 17 in the proper position, a set of compression rods 19 and guide eyelets 21 are installed and extend between the hub 20 and the straps 17.

To install the suspension system 15, a significantly large crane is required to hoist up and position the system 15 over the blades 22. Such cranes are expensive and have to be transported to the wind turbine site, thereby accounting for much of the costs associated with up-tower maintenance and/or repairs of the wind turbine.

Accordingly, a suspension system for suspending a rotor blade that does not require the use of a significantly large crane would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for suspending a rotor blade from a hub of a wind turbine, e.g. for completing up-tower maintenance and/or service work. The method includes removing at least one root attachment assembly from at least one blade root of an adjacent rotor blade. Another step includes providing at least one passageway from an exterior surface of the blade root of the adjacent rotor blade to the removed root attachment assembly. Still another step includes inserting a cable through the at least one passageway such that the cable engages an interior surface of the adjacent rotor blade and extends from within the adjacent rotor blade to the rotor blade. The method further includes securing the cable from the adjacent rotor blade to the lowered rotor blade at an attachment location. Next, the method includes lowering the rotor blade an additional vertical distance from the hub until the rotor blade is supported by the at least one cable.

In one embodiment, the method includes positioning the rotor blade to be suspended in a substantially six o'clock position and lowering the rotor blade an initial vertical distance from a hub of the wind turbine before removing the at least one root attachment assembly.

In another embodiment, the root attachment assembly includes a blade bolt configured with a barrel nut in a generally T-bolt configuration. Thus, in certain embodiments, the method may include removing at least two root attachment assemblies from at least two blade roots of adjacent rotor blades so as to form two bolt holes and two barrel nut holes in each of the adjacent rotor blades. In certain embodiments, the method may further include installing one or more cable guides within at least one of the bolt holes or the barrel nut holes so as to protect the cable when inserted therethrough.

In additional embodiments, the step of providing at least one passageway from the exterior surface of the blade root of the adjacent rotor blade to the root attachment assembly further includes machining a hole from the exterior surface of the adjacent rotor blade to the barrel nut hole. In further embodiments, the method may include providing at least two passageways from the exterior surface of each of the blade roots of the adjacent rotor blades to the barrel nut holes of each of the removed root attachment assemblies. Thus, in certain embodiments, the method includes inserting a cable through the at least one passageway such that the cable engages an interior surface of the adjacent rotor blade and extends from within the adjacent rotor blade to the rotor blade and securing the first cable to a first side of the rotor blade, and inserting a second cable through the two passageways of the other adjacent rotor blade from inside of the hub and attaching the second cable to an opposite side of the rotor blade.

In further embodiments, the method includes installing the attachment elements onto the rotor blade after the blade is positioned in the six o'clock position. In addition, for particular embodiments, the attachment location may include at least two attachment elements or points. More specifically, in certain embodiments, each of the attachment elements may include any one or more of or a combination of the following: an eyelet, a grommet, a metal ring (e.g. a D-ring), a snatch block, a hook and loop fastener, or similar.

In another aspect, the present disclosure is directed to a method for suspending a rotor blade from a hub of a wind turbine. The method includes positioning the rotor blade in a substantially six o'clock position. Another step includes lowering the rotor blade an initial vertical distance from a hub of the wind turbine. The method also includes removing at least one barrel nut from adjacent rotor blades to form at least two barrel nut holes. Further, the method includes providing an opening from an exterior surface of each of the adjacent rotor blades to the barrel nut holes thereof. Still another step includes routing a cable through the openings of each of the adjacent rotor blades from within the adjacent rotor blades. The method also includes securing each of the cables to opposite sides of the rotor blade. Thus, the method further includes lowering the rotor blade an additional vertical distance from the hub until the rotor blade is supported by the cables.

In yet another aspect, the present disclosure is directed to an up-tower suspension system for a rotor blade of a wind turbine. The suspension system includes at least one attachment element configured at a first location on a blade root of the rotor blade and a first cable configured to extend from within a first adjacent rotor blade to the first attachment element. Further, the first cable is configured to suspend the rotor blade a vertical distance from a hub of the wind turbine.

In one embodiment, the suspension system also includes a second attachment element configured at a second location on a blade root of the rotor blade, wherein the second location is generally opposite the first location. Thus, in further embodiments, the suspension system may also include a second cable configured to extend from within a second adjacent rotor blade to the second attachment element.

In certain embodiments, the suspension system may further include a machining device configured to form at least one passageway or opening from an exterior surface of the blade roots of the first and second adjacent rotor blades to one or more root attachment assemblies of the first and second adjacent rotor blades. For example, in particular embodiments, each of the root attachment assemblies may include a T-bolt configuration formed by at least a bolt hole and at least one barrel nut hole configured for receipt of a blade bolt and a barrel nut, thereby creating a hole for the first and second cables to pass through when the blade bolt and the barrel nut are removed. Thus, in further embodiments, the first and second adjacent rotor blades may each include at least two passageways extending from an exterior surface thereof to the barrel nut holes of each of the root attachment assemblies. Accordingly, particular embodiments of the suspension system may include the first cable extending from within the first adjacent rotor blade and through a barrel nut hole thereof to the first attachment element and the second cable extending from within the second adjacent rotor blade and through a barrel nut hole thereof to the second attachment element.

In further embodiments, the suspension system may also include one or more cable guides configured within at least one of the bolt holes or the barrel nut holes so as to protect the at least one cable being inserted therethrough. In addition, it should be understood that the suspension system may be configured with any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine according to conventional construction;

FIG. 2 illustrates a perspective view of the hub of the wind turbine of FIG. 1, particularly illustrating a rotor blade suspension system according to conventional construction;

FIG. 3 illustrates a perspective view of one embodiment of a rotor blade of a wind turbine according to conventional construction;

FIG. 4 illustrates another perspective view of the wind turbine shown in FIG. 1, particularly illustrating the rotor blade lowered an initial vertical distance from the hub;

FIG. 5 illustrates a close-up, partial perspective view of the rotor blade and the hub shown in FIG. 4, particularly illustrating one embodiment of a lowering system including support cables secured to the rotor blade and extending through both a pitch bearing of the wind turbine and corresponding cable translation devices positioned within the hub;

FIG. 6 illustrates a cross-sectional view of the rotor blade and the pitch bearing shown in FIG. 5 prior to the rotor blade being lowered from the hub, particularly illustrating a pair of the support cables and cable translation devices of the lowering system shown in FIG. 5;

FIG. 7 illustrates a top-down view of the pitch bearing shown in FIGS. 5 and 6, particularly illustrating the circumferential positioning of the cable translation devices around the pitch bearing relative to a tower reference line extending radially from the center of the wind turbine tower through the center of the pitch bearing;

FIG. 8 illustrates a similar cross-sectional view to that shown in FIG. 6, particularly illustrating a variation of the blade lowering system in which each pair of support cables secured to the rotor blade includes one support cable in operative association with a corresponding cable transition device and another support cable extending through the pitch bearing without being received within a cable translation device;

FIG. 9 illustrates a close-up, partial perspective view of the rotor blade and the hub shown in FIG. 4, particularly illustrating another embodiment of a lowering system including support cables secured to the rotor blade and corresponding cable translation devices positioned within the hub;

FIG. 10 illustrates a close-up, partial perspective view of the interface between the rotor blade and the pitch bearing shown in FIG. 9 prior to the rotor blade being lowered from the hub, particularly illustrating a support cable coupled between a support nut installed within the blade root and a corresponding cable translation device positioned within the hub;

FIG. 11 illustrates a flow diagram of one embodiment of a method for a suspending a rotor blade from a hub of a wind turbine according to the present disclosure;

FIG. 12 illustrates a front view of one embodiment of a wind turbine, particularly illustrating a suspension system suspending a rotor blade from a hub of the wind turbine according to the present disclosure;

FIG. 13 illustrates a detailed, side view of the wind turbine of FIG. 12, particularly illustrating a suspension system suspending the rotor blade from the hub of the wind turbine; and FIG. 14 illustrates an opposite detailed, side view of the wind turbine of FIG. 12, particularly illustrating a suspension system suspending the rotor blade from the hub of the wind turbine.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to various systems and methods for suspending a rotor blade of a wind turbine for completing service and/or maintenance work to various up-tower wind turbine components. Specifically, as will become apparent from the description provided below, the disclosed systems and methods may allow for maintenance to be performed up-tower of the wind turbine without the use of a large, expensive crane, thereby significantly reducing the associated costs.

Referring now to the drawings, FIGS. 1 and 3 illustrate perspective views of one embodiment of a wind turbine 10 and a corresponding rotor blade 22 that may utilize the suspension system according to the present disclosure. As mentioned, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring particularly to FIG. 3, a perspective view of one of the rotor blades 22 shown in FIG. 1 is illustrated in accordance with aspects of the present disclosure. As shown, the rotor blade 22 includes a blade root 24 configured for mounting the rotor blade 22 to the hub 20 of a wind turbine 10 (FIG. 1) and a blade tip 26 disposed opposite the blade root 24. A body 28 of the rotor blade 22 may extend lengthwise between the blade root 24 and the blade tip 26 and may generally serve as the outer shell of the rotor blade 22. As is generally understood, the body 28 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 28 may generally include a pressure side 30 and a suction side 32 extending between a leading edge 34 and a trailing edge 36. Additionally, the rotor blade 22 may have a span 38 defining the total length of the body 28 between the blade root 24 and the blade tip 26 and a chord 40 defining the total length of the body 28 between the leading edge 34 and the trailing edge 36. As is generally understood, the chord 40 may vary in length with respect to the span 38 as the body 29 extends from the blade root 24 to the blade tip 26.

Moreover, as shown in FIG. 3, the rotor blade 22 may also include a plurality of T-bolts or root attachment assemblies 42 for coupling the blade root 24 to the hub 20 of the wind turbine 10. In general, each root attachment assembly 42 may include a barrel nut 44 mounted within a portion of the blade root 24 and a root bolt 46 coupled to and extending from the barrel nut 44 so as to project outwardly from a root end 48 of the blade root 24. By projecting outwardly from the root end 48, the root bolts 46 may generally be used to couple the blade root 24 to the hub 20 via a pitch bearing 150 (FIG. 6) of the wind turbine 10. For example, the pitch bearing 150 may define a plurality of bolt holes 151 (FIGS. 7-8) configured to receive the root bolts 46. Additionally as will be described below, a portion of such root bolts 46 may also be utilized when the rotor blade 22 is being removed from and/or installed onto the hub 20.

Referring now to FIG. 4, the rotor blade 22 may be initially rotated to a vertically downward position (e.g., a six o'clock position) such that the blade 22 has a generally vertical orientation relative to the support surface 14 of the wind turbine 10. For example, as shown in FIG. 4, the rotor blade 22 is extending vertically downward from the hub 20 such that the blade tip 26 is pointing towards the support surface 14. It should be appreciated that, due to a tilt angle and/or cone angle of the wind turbine 10, the rotor blade 22 may be angled slightly away from the tower 12 when moved to the vertically downward position.

Further, the rotor blade 22 may be initially lowered from the hub 22 by an initial vertical distance 146. Thus, the initial lowering of the rotor blade 22 simply provides space for service and/or maintenance work within and around the hub 20 and/or the removed rotor blade 22. The initial vertical distance 146 may generally correspond to any suitable distance that allows for the installation of appropriate service equipment and/or for personnel to complete repairs. For example, in one embodiment, the initial vertical distance 146 may generally range from about 2 feet to about 15 feet, such as from about 3 feet to about 10 feet or from about 5 feet to about 10 feet and any other subranges therebetween.

Referring now to FIGS. 5-7, one embodiment of suitable components that may be included within a lowering system to initially lower the rotor blade 22 from the hub 20 is illustrated in accordance with aspects of the present subject matter. Specifically, FIG. 5 illustrates a partial perspective view of the hub 20, the rotor blade 22 and the pitch bearing 150 of the wind turbine 10 after the blade 22 has been lowered from the hub 20 by the initial vertical distance 146. FIG. 6 illustrates a partial, cross-sectional view of the interface between the rotor blade 22 and the pitch bearing 150 prior to the blade 22 being lowered relative to the hub 20. Additionally, FIG. 7 illustrates a top view of the pitch bearing 150 of the wind turbine 10, particularly illustrating the relative circumferential positioning of the system components utilized to initially lower the rotor blade 22 relative to the hub 20.

It should be appreciated that, for purposes of illustration, only the inner race of the pitch bearing 150 is shown. As is generally understood, the pitch bearing 150 may also include an outer race configured to be coupled to the hub 20. As such, when the inner race is rotated relative to the outer race of the pitch bearing 150, the rotor blade 22 may be pitched about its pitch axis.

As particularly shown in FIGS. 5 and 6, to allow the rotor blade 22 to be initially lowered, several of the root bolts 46 extending through the bolt holes 151 defined in the pitch bearing 150 may be removed and replaced with suitable support cables 152. For example, as shown in FIG. 5, in one embodiment, eight of the root bolts 46 have been removed and replaced with corresponding support cables 152. In doing so, the remainder of the root bolts 46 may be initially maintained in engagement with the pitch bearing 150 (e.g., via suitable attachment nuts (not shown)) to allow the rotor blade 22 to continue to be supported by the hub 20 until the rotor blade 22 is ready to be lowered.

In general, the support cables 152 may correspond to any suitable cables that are capable of supporting the weight of the rotor blade 22 as it is being lowered relative to the hub 20. For example, in several embodiments, each support cable 152 may correspond to a steel cable or any other suitable wire rope that has a rated load capacity sufficient to handle the weight of the rotor blade 22. In another embodiment, each support cable 152 may correspond to a metal chain or any other suitable elongated cable-like object. Moreover, it should be appreciated that each support cable 152 may generally be configured to define any suitable length that permits the cables to be utilized to lower the rotor blade 22 away from the hub 20 by the initial vertical distance 146.

In addition, the support cables 152 may generally be configured to be coupled to the rotor blade 22 using any suitable attachment means. For example, as shown in the illustrated embodiment, a root end 154 (FIG. 6) of each cable 152 may be coupled to a threaded cable stud 156 configured to be screwed into one of the barrel nuts 44 extending within the blade root 24. In such an embodiment, a swaged or other suitable connection may be formed between the root end 154 of each cable 152 and each cable stud 156 to securely couple to the cables 152 to the corresponding studs 156. In other embodiments, the support cables 152 may be coupled to the blade root 24 using any other suitable means, such as by coupling each support cable 152 to a suitable mounting fixture configured to be secured to the blade root 24.

It should be appreciated that, in embodiments in which the support cables 152 are coupled to the blade root 24 via the threaded cable studs 156, each cable stud 156 may generally be configured to define any suitable length 157. As shown in FIG. 6, in one embodiment, the length 157 of each cable stud 156 may be substantially equal to a corresponding length 159 of the root bolts 46. Alternatively, as shown in the embodiment of FIG. 8, the length 157 of each cable stud 156 may be less than the length 159 of the root bolts 46.

As shown in FIGS. 5 and 6, each support cable 152 may be configured to be in operative association with a suitable cable translation device 158 positioned within the hub 20. In general, each cable translation device 158 may correspond to any suitable device that allows for the rotor blade 22 to be safely and securely moved relative to the hub 20 using the support cables 152. For example, in several embodiments, each cable translation device 152 may correspond to a fluid-driven actuator (e.g., a hydraulic or pneumatic actuator) configured to be in operative association with a corresponding support cable 152 to allow the rotor blade 22 to be lowered and/or raised relative to the hub 20.

Specifically, in a particular embodiment of the present disclosure, each cable translation device 158 may be configured as a hollow lifting/lowering cylinder or as a single strand jack designed to incrementally lower and/or raise the rotor blade 22. For example, as shown in FIG. 6, each device 158 may include a cylinder 160 configured to be coupled to the pitch bearing 150 (e.g., via suitable bolts and/or other mechanical fasteners (not shown)) and a hollow piston 162 configured to receive one of the support cables 152. The piston 162 may generally be configured to be actuated and retracted relative to the cylinder 160 by supplying/expelling a pressurized fluid to/from the cylinder 160 (e.g., via fluid port 164). In addition, each cable translation device 158 may include an upper clamping mechanism 166 positioned directly above the piston 162 and a lower clamping mechanism 168 positioned directly below the piston 162. As is generally understood, the upper and lower clamping mechanisms 166, 168 may be configured to alternatively clamp the support cable 152 as the piston 162 is actuated and retracted, thereby allowing each translation device 152 to lower or raise the rotor blade 22 in short increments with each actuation/retraction of the piston 162.

Additionally, in several embodiments, a stop block 170 may be configured to be installed around each support cable 152 directly above its corresponding cable translation device 158. In general, each stop block 170 may be configured to serve as a built-in safety feature providing a mechanical stop for each support cable 152 in the event of failure of one of the cable translation devices 158. For example, as particularly shown in FIG. 6, each support cable 152 may include a plurality of lugs 172 spaced apart incrementally along the cable's length. In such an embodiment, an opening or slot (not shown) may be defined through each stop block 170 that is dimensionally larger than the cable 152, thereby allowing the cable 152 to pass through the stop block 170 as it is being lowered relative to the translation device 158. However, given their increased size, the lugs 172 may not be capable of passing through the opening or slot defined in each stop block 170. Accordingly, in the event of failure of one of the cable translation devices 158, the lug 172 positioned immediately above the corresponding stop block 170 may come into contact with and engage an upper surface of the block 170, thereby preventing further motion of the support cable 152 relative to the translation device 158. In contrast, during normal operation, the stop blocks 170 may be continuously repositioned along the support cable 152 as each lug 172 is lowered down onto and/or adjacent to its corresponding stop block 170. For example, as indicated by the dashed lines in FIG. 6, when one of the lugs 172 is lowered down into and/or adjacent to one of the stop blocks 170, the stop block 170 may be removed from the support cable 152 and repositioned above such lug 172 to allow the support cable 152 to continue to be lowered through the translation device 158.

It should be appreciated that, in general, each support cable 152 and corresponding translation device 158 may be configured to be installed at any suitable location around the circumference of the blade root 24 and pitch bearing 150. However, in several embodiments, the cables/devices 152, 158 may be grouped in pairs spaced apart around the blade root 24 and pitch bearing 150. For example, as shown in FIG. 7, in one embodiment, each pair of the cable translation devices 158 may be configured to be positioned around the pitch bearing 150 at circumferential locations generally adjacent to a reference line 174 oriented perpendicularly to a tower reference line 176 extending radially from the center of the wind turbine's tower 12 through the center of the pitch bearing 150. Specifically, as shown, each pair of the cable translation devices 158 may generally be spaced apart circumferentially from the reference line 174 by an angle 178 equal to less than about 45 degrees, such as less than about 40 degrees or less than about 35 degrees. Of course, in such an embodiment, the support cables 152 may similarly be secured to the blade root 24 at a corresponding circumferential location relative to the reference line 174. Such positioning of the cables/devices 152, 158 adjacent to the reference line 174 may, in certain rotor blade configurations, allow for the rotor blade 22 to be slightly angled away from the tower 12 as the blade 22 is being lowered relative to the hub 20 due to the location of the blade's center of gravity.

As indicated above, in one embodiment, eight support cables 152 and corresponding translation devices 158 may be installed to assist in lowering the rotor blade 22 relative to the hub 20. However, in other embodiments, any other suitable number of support cables 152 and translation devices 158 may be utilized to lower the rotor blade 22 relative to the hub 20. For instance, in one embodiment, the rotor blade 22 may be lowered using only four cables/devices 152, 158 or using only two cables/devices 152, 158.

Additionally, in other embodiments, only a portion of the support cables 152 coupled to the rotor blade 22 may be configured to be in operative association with corresponding cable translation devices 158. For instance, FIG. 8 illustrates an alternative embodiment to the embodiment shown in FIG. 6. As shown in FIG. 8, for each pair of support cables 152 extending from the blade root 24, one of the cables 152 may be configured to be in operative association with a corresponding translation device 158 positioned within the hub 20. In such an embodiment, each support cable 152 not associated with a translation device 158 may simply be used to provide additional support for the rotor blade 22 as it is being lowered. In addition, such support cables 152 may also be configured to be utilized in connection with the stop blocks 170 described above. For instance, as shown in FIG. 8, the stop block 170 may be positioned directly above the pitch bearing 150 to allow the stop block 170 to be engaged between one of the cable lugs 172 and the pitch bearing 150 in the event of failure of one or more of the translation devices 158 installed on any of the other support cables 152.

It should be appreciated that, in further embodiments of the present subject matter, the rotor blade 22 may be configured to be initially lowered from the hub 20 using any other suitable lowering means known in the art. For instance, as an alternative to the fluid-driven cable translation devices 158 described above, the cable translation devices may correspond to winches positioned within the hub 20. In such an embodiment, the support cables 152 may be unwound from each associated winch in order to initially lower the rotor blade 22 from the hub 20. In another embodiment, the support cables 152 may be replaced with elongated threaded rods. In such an embodiment, the threaded rods may be received within a suitable translation device (e.g., a screw jack) configured to allow the rods to be moved relative to the device, thereby allowing the rotor blade 22 to be lowered relative to the hub 20.

Referring now to FIGS. 9 and 10, another embodiment of suitable components that may be included within a lowering system to initially lower the rotor blade 22 from the hub 20 an initial vertical distance 146 is illustrated in accordance with aspects of the present subject matter. Specifically, FIG. 9 illustrates a partial perspective view of the hub 20, the rotor blade 22 and the pitch bearing 150 of the wind turbine 10 after the blade 22 has been lowered from the hub 20 by the initial vertical distance 146. FIG. 10 illustrates a partial, perspective view of the interior of the hub 20 at the interface between the rotor blade 22 and the pitch bearing 150 prior to the blade 22 being lowered relative to the hub 20.

As particularly shown in FIGS. 9 and 10, to allow the rotor blade 22 to be initially lowered, several of the root bolts 46 extending through the bolt holes 151 defined in the pitch bearing 150 may be removed. The existing barrel nuts 44 associated with such bolts 46 may then be replaced with cylindrically-shaped support nuts 300, with each support nut 300 being configured to allow a corresponding support cable 302 to be coupled to the blade root 24. For example, as shown in FIG. 9, in one embodiment, four of the existing barrel nuts 44 may be removed and replaced with suitable support nuts 300. In doing so, the remainder of the root bolts 46 may be initially maintained in engagement with the pitch bearing 150 (e.g., via suitable attachment nuts 304 (FIG. 10) to allow the rotor blade 22 to continue to be supported by the hub 20 until the rotor blade 22 is ready to be lowered.

As indicated above, in one embodiment, four support nuts 300 may be installed through the blade root 24 in place of the existing barrel nuts 44 to allow four corresponding support cables 302 to be coupled to the rotor blade 22. However, in other embodiments, any other suitable number of support nuts 300 may be secured within the blade root 24 to provide a means for coupling a corresponding number of support cables 302 to the rotor blade 22, such as by installing less than four support nuts 300 within the blade root 24 (e.g., two or three support nuts) or greater than four support nuts 300 within the blade root 24 (e.g., five, six or more support nuts).

Additionally, it should be appreciated that the support nuts 300 may be configured to be maintained in position relative to the rotor blade 22 using any suitable attachment means. For instance, in one embodiment, once a given support nut 300 is inserted within the blade root 24, a corresponding root bolt 46 may be inserted through the pitch bearing 150 and screwed into the vertically extending opening 306 of the support nut 300 in order to secure the nut 300 within the blade root 24. Alternatively, as shown in FIG. 10, an alignment pin 312 may be configured to be inserted through the pitch bearing 150 and screwed into the vertically extending opening 306 of each support nut 300. In such an embodiment, each alignment pin 312 may generally be configured for attachment within the corresponding support nut 300 in a manner similar to the existing root bolts 46 and, thus, may include a threaded end 314 for engaging the threaded opening 306 of the support nut 300. However, as shown in FIG. 10, each alignment pin 312 may define a vertical height or length 316 that is greater than the length 159 (FIG. 6) of the root bolts 46. Accordingly, the alignment pins 312 may also be utilized to align the rotor blade with pitch bearing as the rotor blade (or a different rotor blade with the alignment pins installed therein) is being lifted up onto the hub.

Referring still to FIGS. 9 and 10, each support cable 302 may be configured to extend from one of the support nuts 300 to a corresponding cable translation device 318 positioned within the hub 20. As shown in FIG. 10, in one embodiment, the cable translation device 318 may correspond to cable hoists (including chain hoists) configured to be mounted to and/or supported by any suitable wind turbine component(s) positioned within the hub 20 (e.g., the hub gusset(s), joist(s) and/or any other suitable component(s)). As is generally understood, cable hoists may be configured to allow suitable cables to be passed therethrough in a controlled manner. Thus, in the present application, such cable hoists may be utilized to safely and effectively lower the rotor blade 22 relative to the hub 20.

It should also be appreciated that, similar to the support cables 152 described above, each support cable 302 may generally correspond to any suitable elongated cable-like object that has a rated load capacity sufficient to handle the weight of the rotor blade 22. For instance, as shown in the illustrated embodiment, the support cables 302 are configured as metal chains. However, in other embodiments, the support cables 302 may correspond to steel cables or any other suitable wire ropes. Moreover, it should be appreciated that each support cable 302 may generally be configured to define any suitable length that permits the cables 302 to be utilized to lower the rotor blade 22 away from the hub 20 by the initial vertical distance 146.

Referring now to FIGS. 11-14, various embodiments of the suspension system 100 according to the present disclosure are illustrated. More specifically, FIG. 12 illustrates an up-tower suspension system 100 secured to the rotor blade 22/23 for suspending the rotor blade 23 after the blade 23 has been initially lowered from the hub 20. As shown, the suspension system 100 of the present disclosure suspends the rotor blade 23 a certain distance from the hub 20 for the purpose of completing maintenance and/or service work to various wind turbine components. For example, as shown generally in FIGS. 12-14, the suspension system 100 includes a first cable 102 or strap extending from within a first adjacent rotor blade 25 to a first location 105 on the lowered rotor blade 23 and a second cable 110 or strap extending from within a second adjacent rotor blade 27 to a second location 109 on the lowered rotor blade 23. In certain embodiments, the second location 109 is generally opposite of the first location 105 to provide symmetric support to the suspended rotor blade 23.

Further, each attachment location 105, 109 on the lowered rotor blade 23 may include at least one attachment element 104, 108. More specifically, as shown, the first and second locations 105, 109 each include two attachment elements 104, 108 or points. It should be understood that further embodiments may include more than two or less than two attachment elements 104, 108. In certain embodiments, the attachment elements 104, 108 or points may include any suitable hardware now known or later developed in the art, including but not limited to an eyelet or grommet, one or more metal rings (e.g. a D-ring), a snatch block, a hook and loop fastener, or similar. For example, as shown generally in FIGS. 13 and 14, each end of the cables 102, 110 includes a loop configuration attached to the rotor blade 22 via a metal ring. More specifically, each of the metal rings is secured to an attachment bolt that is secured to the blade root of the rotor blade 23.

Referring particularly to FIG. 11, a flow diagram of one embodiment of a method 200 for suspending a rotor blade 22 from a hub 20 of a wind turbine 10 via the suspension system 100 is illustrated. As shown at 202, the method 200 includes positioning the rotor blade 23 to be suspended in a substantially six o'clock position as shown in FIG. 12. At 204, the method 200 includes lowering the rotor blade 23 an initial vertical distance 146 from the hub 20 of the wind turbine 10. At 206, the method 200 includes removing at least one root attachment assembly 42 from the adjacent rotor blades 25, 27 to form at least one root attachment assembly hole in each of the adjacent rotor blades 25, 27. For example, as mentioned, the root attachment assemblies 42 of each rotor blade 22 may include a T-bolt configuration having at least one blade boot 46 configured with a barrel nut 44. Thus, removal of the root attachment assemblies 42 form corresponding bolt holes and barrel nut holes.

As such, at 208, the method 200 further includes providing or forming a passageway 106 or opening from an exterior surface of each of the adjacent rotor blades 25, 27 to the barrel nut holes thereof as shown in FIGS. 13 and 14. For example, in certain embodiments, the method 200 may include machining, via a machining device, an exterior surface of the adjacent rotor blades 25, 27 to form one or more passageways 106, 112 from the exterior surface of the blade roots of the first and second adjacent rotor blades 25, 27 to the barrel nut holes of the first and second adjacent rotor blades. More specifically, as shown in FIGS. 13 and 14, the covering or hoop which covers the outside end of the removed barrel nut may be machined or pierced, e.g. using a saw or any other suitable machining device, to create an opening to the outside of the blade root of the adjacent rotor blades 25, 27. Thus, at 210, the method 200 may also include routing a first cable 102 through the first passageway(s) 106 of one of the adjacent rotor blades 25 from within the adjacent rotor blade 25 and routing a second cable 110 through the second passageway 112(s) of another adjacent rotor blade 27 from within the adjacent rotor blade 27. More specifically, as shown in FIGS. 13 and 14, each of the adjacent rotor blades 25, 27 has two passageways 106, 112 and includes one cable 102, 110 routed from inside of the rotor blades 25, 27 and extending from both of the passageways 106, 112 to the lowered rotor blade 23. In certain embodiments, the method 200 may also include installing one or more cable guides within the bolt holes and/or the barrel nut holes so as to protect the cables 102, 110 (i.e. to prevent chafing of the cables 102, 110).

Referring still to FIG. 11, at 212, the method 200 includes securing each of the cables 102, 110 to opposite sides of the lowered rotor blade 23. Thus, the opposite cables 102, 110 provide symmetric and secure suspension of the rotor blade 23 during service work. Further, as shown at 214, the method 200 includes lowering the rotor blade 23 an additional vertical distance from the hub 20 until the rotor blade 23 is supported by the cables 102, 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for suspending a rotor blade from a hub of a wind turbine, the method comprising:
   positioning the rotor blade in a substantially six o'clock position;
   detaching the rotor blade from the hub by removing a plurality of root attachment assemblies from the rotor blade;
   lowering the rotor blade an initial vertical distance from the hub;
   removing at least one root attachment assembly from at least one blade root of an adjacent rotor blade;
   providing at least one passageway from an exterior surface of the at least one blade root of the adjacent rotor blade to the at least one root attachment assembly;
   inserting at least one cable through the at least one passageway such that the at least one cable engages an interior surface of the adjacent rotor blade and extends from within the adjacent rotor blade to the rotor blade;
   securing the at least one cable to the rotor blade at an attachment location; and
   lowering the rotor blade a vertical distance from the hub until the rotor blade is supported by the at least one cable.

2. The method of claim 1, wherein the at least one root attachment assembly comprises a blade bolt configured with a barrel nut in a generally T-bolt configuration.

3. The method of claim 2, wherein removing at least one root attachment assembly from at least one blade root of an adjacent rotor blade further comprises removing at least two root attachment assemblies from at least two blade roots of adjacent rotor blades so as to form two bolt holes and two barrel nut holes in each of the adjacent rotor blades.

4. The method of claim 3, further comprising forming at least two passageways from the exterior surface of the at least two blade roots of the adjacent rotor blades to the two barrel nut holes of each of the removed root attachment assemblies.

5. The method of claim 4, further comprising inserting a first cable through the two passageways of one of the adjacent rotor blades from inside of the hub and securing the first cable to a first attachment location of the rotor blade, and inserting a second cable through the two passageways of the other adjacent rotor blade from inside of the hub and attaching the second cable to a second attachment location of the rotor blade.

6. The method of claim 5, wherein the first and second attachment locations each comprise at least two attachment elements.

7. The method of claim 6, wherein the at least attachment elements further comprise any one of or a combination of the following: an eyelet, a grommet, a metal ring, a snatch block, or a hook and loop fastener.

8. The method of claim 3, wherein providing at least one passageway from the exterior surface of the blade root of the adjacent rotor blade to the at least one root attachment assembly further comprises machining a hole from the exterior surface of the adjacent rotor blade to the barrel nut hole.

* * * * *

UNITED STATES PATENT AND TRADEMARK OFFICE
CERTIFICATE OF CORRECTION

PATENT NO. : 9,890,022 B2
APPLICATION NO. : 14/706409
DATED : February 13, 2018
INVENTOR(S) : Ulrich Werner Neumann et al.

Page 1 of 1

It is certified that error appears in the above-identified patent and that said Letters Patent is hereby corrected as shown below:

Claim 7 (Column 13, Line 23):
-- The method of claim 6, wherein the at least attachment -- should read -- The method of claim 6, wherein the at least two attachments --

Signed and Sealed this
Eighth Day of May, 2018

Andrei Iancu
*Director of the United States Patent and Trademark Office*